United States Patent [19]

Sasaki

[11] Patent Number: 4,763,560
[45] Date of Patent: Aug. 16, 1988

[54] METHOD AND APPARATUS FOR CONTROLLING AND POSITIONING FLUID ACTUATOR

[75] Inventor: Katsumi Sasaki, Aichi, Japan

[73] Assignee: Tokyo Precision Instruments Co., Ltd., Kanagawa, Japan

[21] Appl. No.: 71,529

[22] Filed: Jul. 8, 1987

Related U.S. Application Data

[63] Continuation of Ser. No. 735,823, May 17, 1985, abandoned.

[30] Foreign Application Priority Data

May 25, 1984 [JP] Japan ............................ 59-107150
May 25, 1984 [JP] Japan ............................ 59-107151

[51] Int. Cl.⁴ ............................................ F15B 13/16
[52] U.S. Cl. ............................................ 91/364; 91/6; 91/361; 91/403; 91/459
[58] Field of Search .............. 251/31; 137/596.17; 91/6, 31, 361, 364, 399, 403, 410, 459

[56] References Cited

U.S. PATENT DOCUMENTS

| | | | |
|---|---|---|---|
| 3,038,449 | 6/1962 | Murphy et al. | 91/6 |
| 3,768,875 | 10/1973 | Davis et al. | 91/454 |
| 4,106,390 | 8/1978 | Kodaira et al. | 91/361 |
| 4,358,989 | 11/1982 | Tordenmalm | 91/361 |
| 4,518,011 | 5/1985 | Stoll | 137/596.17 |
| 4,528,894 | 7/1985 | Crosby | 91/361 |
| 4,595,979 | 6/1986 | Arai et al. | 91/361 |
| 4,643,074 | 2/1987 | Gunda et al. | 91/361 |

FOREIGN PATENT DOCUMENTS 0040075 11/1981 European Pat. Off. ............ 91/361

Primary Examiner—Samuel Scott
Assistant Examiner—Noah Kamen
Attorney, Agent, or Firm—Koda and Androlia

[57] ABSTRACT

Method and apparatus of controlling and positioning a fluid actuator by supplying pressurized fluid to right and left actuating chambers of the actuator through an on-off control valves. To drive and position the actuator rapidly and accurately, the actuator can be driven at a higher speed by an initial driving force until it reaches near the desired position and continuously moved at a low speed by gradually increasing the fluid pressure to be supplied to the right and left actuating chambers of the actuator. The initial driving force in the high-speed range becomes maximum when the pressure is applied to one of the right and left actuating chambers while at the same time the other actuating chamber is exhausted. In the low-speed range and near the target position, the one actuating chamber is continuously supplied with the pressure while at the same time the other actuating chamber is gradually closed. Thus, the speed of movement of the actuator can be reduced in the low-speed range and ultimately stopped by raised pressures acting on the opposite sides of the actuator. At the target position, accordingly, the actuator can accurately be positioned against any external disturbance.

8 Claims, 10 Drawing Sheets

METHOD AND APPARATUS FOR CONTROLLING AND POSITIONING FLUID ACTUATOR

This is a continuation of application Ser. No. 735,823, filed May 17, 1985 now abandoned.

BACKGROUND OF THE INVENTION

1. Technical Field of the Invention

The present invention relates to a method and apparatus of the positioning of a fluid actuator and particularly to improved method and apparatus for rapidly and accurately setting a fluid actuator by supplying pressurized fluid to the right and left actuating chambers thereof through an on-off control valve.

2. Description of the Prior Art

Hydraulic and pneumatic actuators for driving or positioning various types of operating devices are well-known and currently utilized as fluid actuators in various fields of industry. Although these fluid actuators have been utilized mainly in industrial machines, they are recently being used to control robots. There is accordingly required a fluid actuator which can rapidly and accurately be positioned under severer conditions.

In general, the fluid actuator comprises an on-off control valve through which a pressurized fluid is supplied to the right and left actuating chamber of the actuator, the desired position of the actuator being depending on the amount of the supplied fluid. The relatively rough construction of the prior art fluid actuators are disadvantageous in that the positioning operation cannot rapidly be attained within a predetermined range of movement with an accuracy of 100 $\mu$m or less only by operating the control valve.

To overcome such a disadvantage in the prior art, some improved fluid actuators have been proposed. For example, Japanese Laid-Open Patent Sho No. 58-174701 discloses a fluid actuator which includes an electromagnetic valve having an expectable delay in response and hydraulic cylinder controlled in accordance with a predetermined result of operation without hunting which would easily be created in such a fluid actuator. However, this proposal also cannot accomplish any high-accuracy positioning.

SUMMARY OF THE INVENTION

It is an object of the present invention to provide improved method and apparatus for rapidly and accurately driving and positioning a fluid actuator.

To accomplish the above object, the present invention provides a fluid actuator which can be moved respectively in high-speed and low-speed ranges. The fluid actuator is moved at a higher speed by an initial driving force until it reaches near the desired position. In the low-speed range set near the target position, the fluid actuator is moved at a lower speed by gradually increasing the fluid pressure to be supplied to the right and left actuating chambers of the actuator. Thus, the positioning can be attained with higher accuracy.

In accordance with the present invention, particularly, the initial driving force in the high-speed range becomes maximum when the pressure is applied to one of the right and left actuating chambers while at the same time the other actuating chamber is released. In the low-speed range and near the target position, the one actuating chamber is continuously supplied with the pressure while at the same time the other actuating chamber is gradually closed. Thus, the speed of movement of the actuator can be reduced in the low-speed range and ultimately stopped by raised pressures acting on the opposite sides of the actuator. At the target position, accordingly, the actuator can accurately be positioned against any external disturbance.

DESCRIPTION OF PREFERRED EMBODIMENTS

Construction of Fluid Actuator

Figure 1:
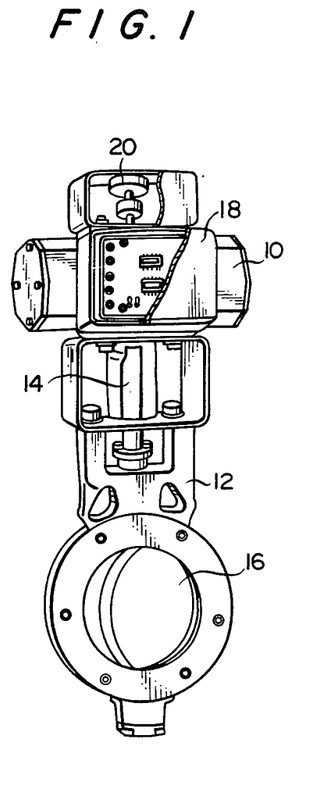
FIG. 1 is a schematically perspective view of an apparatus for controlling the rotational angle of a butterfly valve, to which apparatus a method of the present invention for controlling a fluid actuator is applied.

Referring first to FIG. 1, there is shown a fluid actuator according to the present invention which is used to control the rotational angle of a butterfly valve. The fluid actuator 10 is pneumatically driven with the rotational movement thereof being transmitted to a butterfly valve 16 through a drive shaft 14 which is supported by a base journal 12. The actuator 10 includes a piston (not shown) which is reciprocated therein to determine the opening angle $\theta$ of the butterfly valve 16 toward its target value.

The fluid actuator 10 also comprises a pneumatic valve selection circuit including an on-off control valve which will be described hereinafter. This on-off control valve can be controlled by electrical command signals from a control circuit block 18.

The apparatus of the present invention further comprises a potentiometer 20 operatively associated with the actuator 10 with the amount of control thereof being detected as electrical signals.

Figure 2:
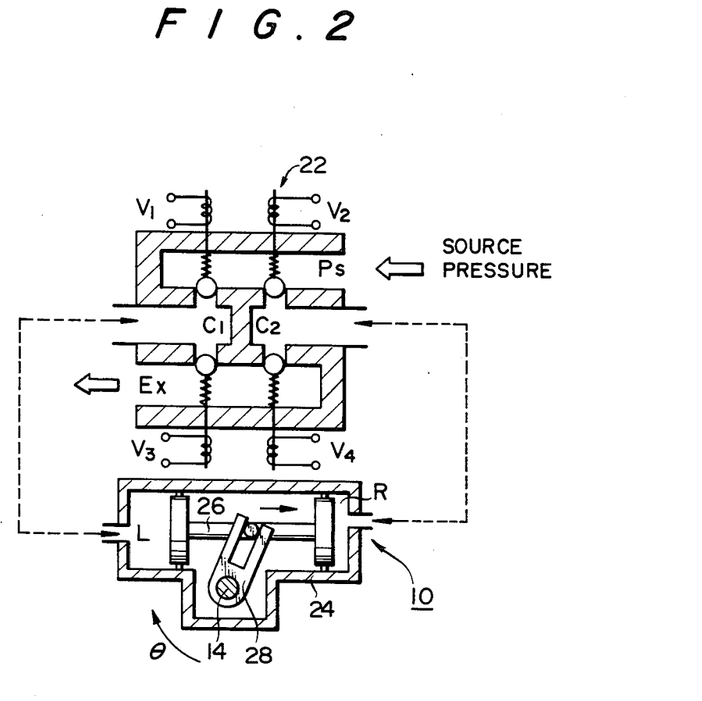
FIG. 2 is a schematic view illustrating the fluid actuator of FIG. 1 and its pneumatic selection circuit.

FIG. 2 schematically shows the actuator of FIG. 1 and its pneumatic selection circuit 22. The pneumatic actuator 10 comprises a cylinder 24 and a piston 26 reciprocated within the cylinder 24. The reciprocation of the piston 26 is converted into the rotation of the drive shaft 14 through a lever 28.

The pneumatic selection circuit 22 includes four on-off control valve $V_1$, $V_2$, $V_3$ and $V_4$ each of which includes a ball valve biased against its valve seat by means of a spring. Each of the ball valves can be opened against the force of the above spring by an electrical exciting signal which is applied to an exciting coil associated therewith.

Two of the on-off control valves $V_1$ and $V_2$ are connected with a source of pressure $P_s$ while the remaining on-off control valves $V_3$ and $V_4$ are opened to atmosphere Ex.

The outputs of the control valves $V_1$ and $V_3$ are connected with the left-hand actuating chamber L of the actuator 10 while the outputs of the control valves $V_2$ and $V_4$ are connected with the right-hand actuating chamber R of the same actuator 10.

Where all the control valves $V_1$, $V_2$, $V_3$ and $V_4$ are in closed position and when only the valve $V_1$ is opened, a source pressure $P_s$ is connected to the left-hand actuating chamber L to move the piston 26 rightwardly when valve $V_4$ is opened. If only the control valve $V_2$ is opened, the source pressure $P_s$ is connected with the right-hand actuating chamber R of the actuator 10 to move the piston 26 leftwardly when valve $V_3$ is opened. Furthermore, the opening of the control valve $V_3$ connects the left-hand actuating chamber L with atmosphere while the opening of the control valve $V_4$ connects the right-hand actuating chamber R of the actuator 10 with atmosphere.

Figure 3:
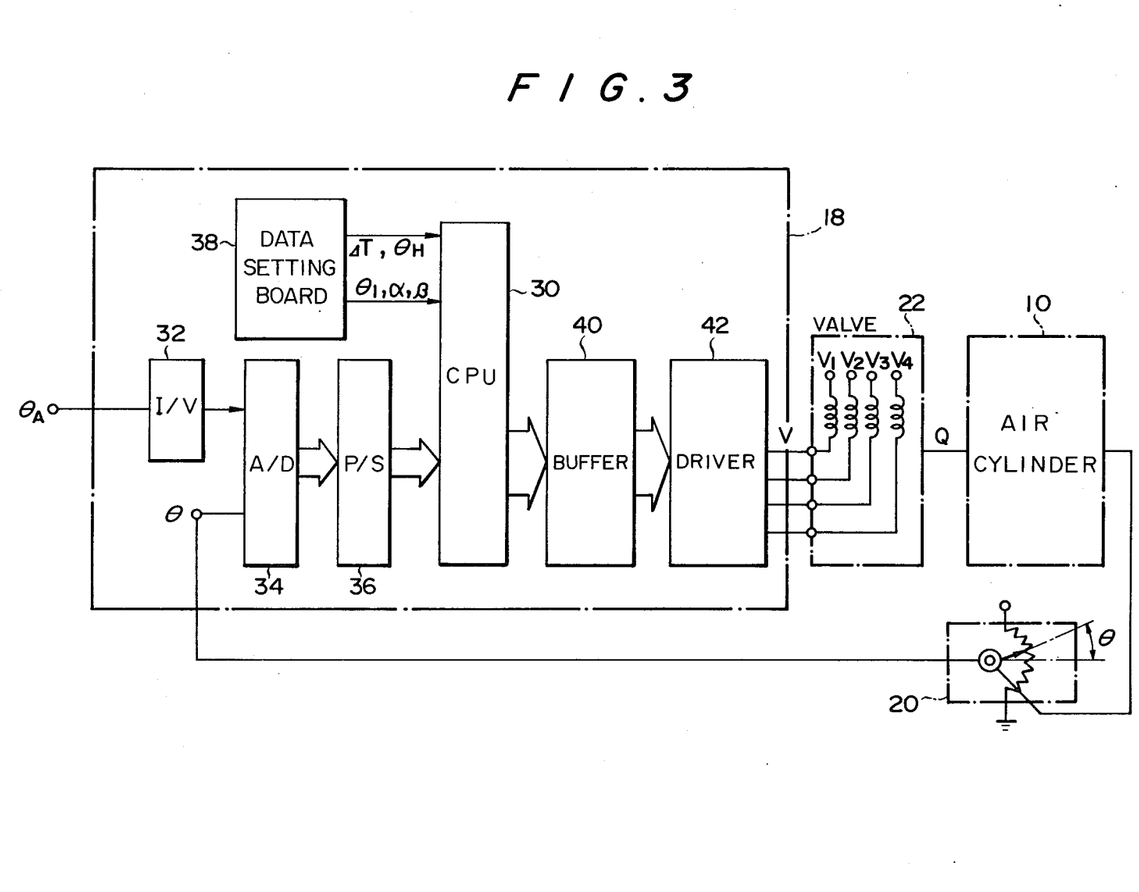
FIG. 3 is a block diagram of the control circuit shown in FIG. 1.

Referring now to FIG. 3, there is shown an electrical control circuit for the actuator 10 in which the control circuit block 18 is adapted to generate a signal to be applied to each valve in the pneumatic valve selection circuit 22 so that the piston 26 will be moved in the desired manner. The movement of the piston 26 is detected by the potentiometer 20 which in turn generates an electrical signal corresponding to the movement of the piston 26 and being fed back to the control circuit block 18.

The control circuit block 18 includes a CPU 30 for effecting various operations and controls. CPU 30 receives various control data including present and target position signals $\theta$ and $\theta_A$ from the potentiometer 20. The target position signal $\theta_A$ is converted by a current-to-voltage converter 32 into a voltage signal which is subsequently converted by an A/D converter 34 into a digital signal. This digital signal is supplied to CPU 30 through a parallel-series converter 36.

Similarly, the present position signal $\theta$ from the potentiometer 20 is supplied to CPU 30 through the A/D converter 34 and the parallel-series converter 36. Various operational settings have been supplied from a setting device 38 to CPU 30. The settings, present position signal $\theta$ and target position signal $\theta_A$ are computed in accordance with a predetermined operational formula. The resulting values are supplied to a driver 42 through a buffer 40. The driver 42 then generates electrical on-off control signals which are, in turn, supplied to the respective control valves in the pneumatic valve selection circuit 22.

Control of the Actuator

The fluid actuator shown in FIG. 2 will now be described in connection with the case where its piston 26 is rightwardly moved to rotate the drive shaft 14 of the butterfly valve 16 (in FIG. 1) rapidly and accurately from the present position $\theta$ to a target position $\theta_A$.

A reference signal concerned to the target position $\theta_A$ is externally put into the control circuit block 18. As described hereinbefore, this reference signal is converted into a voltage signal and then supplied to CPU 30 through the A/D and parallel-series converters 34 and 36.

In accordance with the present invention, the control of the actuator is carried out through at least two steps, a first step wherein an initial driving force is obtained in a high-speed range and a second step providing a low-speed range wherein the actuator is moved at a lower speed to provide an accurate position in the vicinity of target position.

The low-speed range is preset near the target position, for example, as a fixed region in the illustrated embodiment. As can be seen from FIG. 4, two low-speed ranges are set on the opposite sides of the target position $\theta_A$ through an angle $\theta_1$, respectively. As will be apparent from FIG. 3, the set angle $\theta_1$ is supplied from the setting device 38 to CPU 30 as a digital angle signal. The set angle is preferably in the range of about one degree to about eight degrees.

Figure 4:
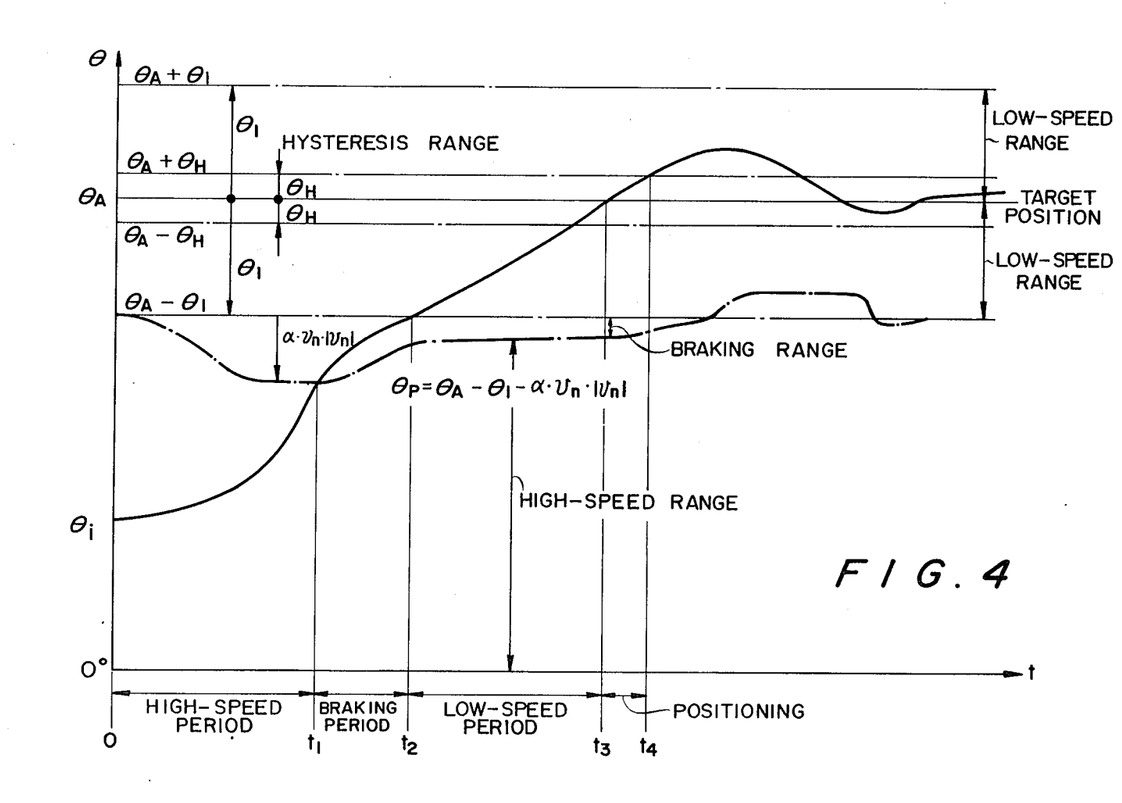
FIG. 4 illustrates a preferred embodiment of the present invention.

The actuator 10 is driven at a higher speed from its present position to either of the low-speed periods. This higher speed is attained by an initial driving force which becomes maximum by applying the source pressure $P_s$ to one of the actuating chambers of the actuator 10 while the other chamber is released. When the piston position of actuator 10 reaches the low-speed periods, the other actuating chamber is gradually closed while the source pressure is applied to the one actuating chamber. Thus, the pressures in both the actuating chambers may be balanced with each other to make piston position of the actuator 10 at the desired target position $\theta_A$ closely.

In accordance with the present invention, a braking period is provided between the high-speed and low-speed period to obtain a minimum transient period of time until the actuator is at rest.

In the braking period of the illustrated embodiment, very large braking action can be attained by applying the source pressure $P_s$ to one of the actuating chambers while at the same time the other actuating chamber is completely closed or by applying the source pressure $P_s$ simultaneously to both the actuating chambers.

The transient of each control variables according to the present invention will now be described in detail with reference to FIGS. 4 and 5.

When a target position signal $\theta_A$ is put into the control circuit block 18 at time 0, the actuator 10 is driven to rotate the drive shaft 14 of the butterfly valve 16 clockwise as viewed in FIG. 2. Thus, the on-off control valves $V_1$ and $V_4$ are opened and the control valves $V_2$ and $V_3$ are closed in the high-speed period from time 0 to time $t_1$, as shown in FIG. 5.

In the high-speed period, therefore, a source pressure $P_s$ is applied to the left-hand actuating chamber L of the actuator 10 through the control valve $V_1$ while at the same time the right-hand actuating chamber R of the actuator 10 is exhausted to atmosphere through the opened control valve $V_4$. Thus, the piston 26 will be moved rightwardly by the maximum driving force.

During the movement of the actuator 10, the speed of motion of the piston 26 is monitored by CPU 30. In the illustrated embodiment, the angular velocity of the drive shaft 14 is instantaneously computed by CPU 30. In other words, the angular velocity $V_n$ is computed in accordance with the following formula:

$$V_n = (\theta_n - \theta_{n-1})/\Delta T$$

where ΔT is a sampling cycle put into CPU 30 by the aid of the setting device 38, for example, in the order of 100 milliseconds. The butterfly valve in the present embodiment is therefore monitored in angular velocity for each 100 milliseconds. Subsequent sampling controls will be effect on the basis of this sampling cycle ΔT.

Due to the fact that in the high-speed period, one of the actuating chambers of the fluid actuator 10 receives the maximum source pressure $P_s$ while at the same time the other actuating chamber is exhausted, the piston 26 can be driven in the actuator 10 at an extremely high speed with the angular velocity thereof being gradually increased. To balance such a high-speed movement with the low-speed period specifically provided by the present invention, the present embodiment provides a braking period between the high-speed and low-speed period. Although this braking range may be fixed as in the low-speed period, the braking range $\theta_p$ is variable depending on the velocity of movement of the actuator in the present embodiment.

The braking period $\theta_p$ is located at or before the forward end of the low-speed range and determined by the following formula:

$$\theta_p = \theta_A - \theta_1 - \alpha \cdot V_n \cdot |V_n|.$$

As can be seen from FIG. 4, the braking period is set close to the high-speed period by $\alpha \cdot V_n \cdot |V_n|$. In accordance with the above formula, therefore, the braking range $\theta_p$ is shifted toward the high-speed period as the velocity of the actuator 10 is increased, and widened as the differential velocity between the high-speed and low-speed periods is increased.

The constant $\alpha$ has been supplied from the setting device 38 to CPU 30.

In the embodiment of FIG. 4, the curve representing the piston movement of the actuator 10 intersects the braking period at time $t_1$. The range from the time $t_1$ to time $t_2$ at which the curve of the piston movement intersects the low-speed period can be defined by the braking period.

The basic braking action in the present invention resides is embodied in the fact that the source pressure $P_s$ is applied to one of the actuating chambers L while at the same time the other actuating chamber R is completely closed. For such a purpose, at time $t_1$, the on-off control valve $V_4$ is closed to prevent the actuating chamber R from giving vent to atmosphere. Although the piston 26 is moved rightwardly by the source pressure $P_s$ from the actuating chamber L, the velocity thereof will gradually be decreased since the other actuating chamber R is closed.

In the present embodiment, furthermore, the on-off control valve $V_2$ is opened to increase the braking action. Thus, the source pressure $P_s$ is directly applied also to the closed chamber R. The source pressure $P_s$ will act on the opposite sides of the piston 26 to remarkably increase the braking force.

Since the piston 26 has already been driven at a predetermined initial speed, however, it will not be stopped in the braking range. In addition, the braking period is varied depending on the detected velocities of the actuator in accordance with the present invention. If the piston 26 should be stopped in the braking period, that value of the braking period would correspond to a value in the low-speed range. Accordingly, the actuator 10 can be returned to the high-speed range to continue the desired action.

When the curve of movement of the actuator 10 intersects the low-speed range at time $t_2$, the low-speed movement is initiated and continued until time $t_3$ at which the target position is attained by the actuator 10.

According to the present invention, the low-speed control is accomplished by partially closing the other actuating chamber R while the source pressure $P_s$ is applied to the one actuating chamber L.

Furthermore, the present embodiment is characterized in that the partial closing of the actuating chamber is controlled by pulse width controlling. Therefore, the control valve $V_4$ is intermittently closed in accordance with a timing corresponding to the velocity of the piston 26. The intermittent control is carried out with the aforementioned sampling cycle ΔT. During each sampling cycle ΔT, the control valve $V_4$ is opened only for a computed period of time Δt and maintained closed during the remaining period (ΔT−Δt).

The above period Δt is computed by the following formula:

$$\Delta t = \beta_1(\beta_2 - |V_n|).$$

As be apparent from this formula, the control period Δt is decreased when the velocity of the piston is increased. As a result, the period during which the other actuating chamber R is closed is increased to provide a larger braking force to rapidly reduce the velocity of the piston. On the other hand, as the velocity of the piston 26 in the actuator 10 is decreased, the control period Δt is increased to maintain the actuating chamber R open through a prolonged period of time. Therefore, the actuator 10 will be controlled at a higher speed.

The constants $\beta_1$ and $\beta_2$ also are supplied from the setting device 38 to CPU 30.

To provide the more increased advantage in the low-speed range, the present invention is characterized by the fact that in addition to the venting of the other actuating chamber R to atmosphere through the control period of time Δt, the application of the source pressure $P_s$ to the other actuating chamber R can positively be effected with the reverse polarity against the venting of the same.

Figure 5:
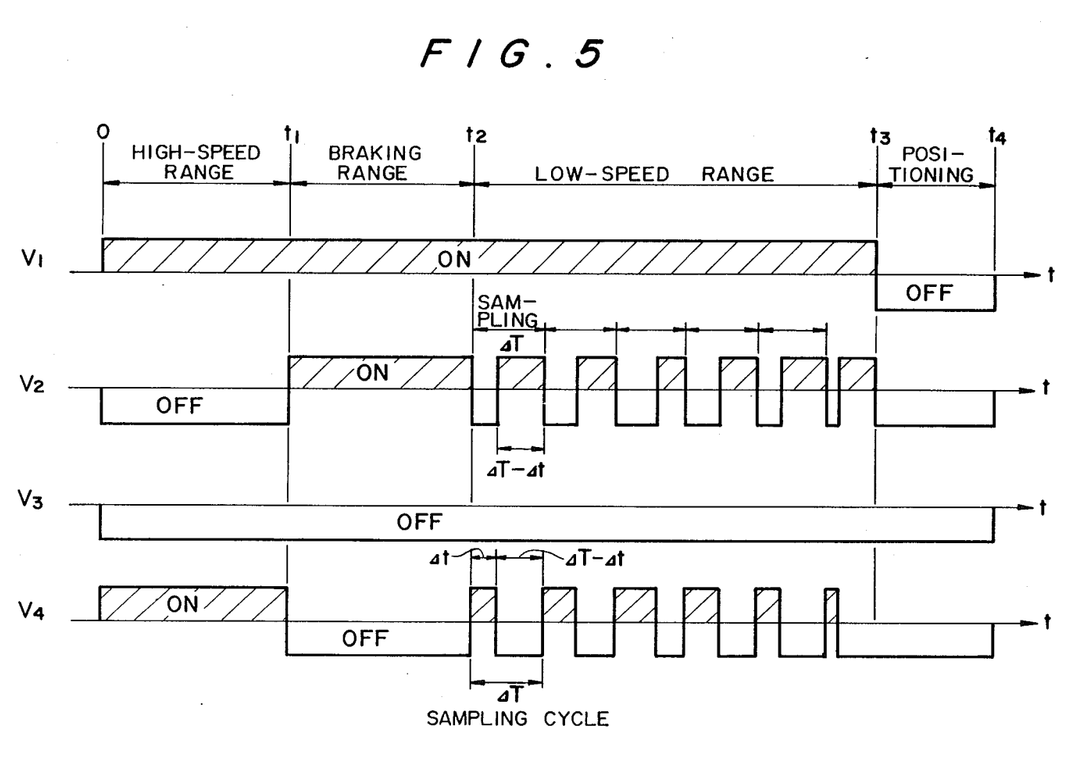
FIG. 5 is a timing chart of the pneumatic valve selection circuit used in the preferred embodiment of FIG. 4.

As seen from FIG. 5, the on-off control valve $V_4$ for controlling the venting of the actuating chamber R to atmosphere is controlled in the reverse polarity against the on-off control valve $V_2$ for controlling the application of the source pressure $P_s$ to the actuating chamber R. As a result, the source pressure $P_s$ supplied from the control valve $V_2$ to the actuating chamber R is blocked when the actuating chamber R is opened to atmosphere. Under such a situation, the source pressure $P_s$ is applied to the actuating chamber R only when the latter is blocked from atmosphere.

Various constants are actually selected such that both the actuating chambers L and R of the actuator 10 are filled with the source pressure $P_s$ at time $t_3$ whereat the curve of movement reaches the target position $\theta_A$.

At time $t_3$, all the control valves $V_1$, $V_2$, $V_3$ and $V_4$ in the pneumatic valve selection circuit 22 are closed to maintain the internal pressure of both the actuating chambers L and R at a pressure equal to the source pressure $P_s$. Under such a condition, the piston 26 is fixedly positioned in the fluid actuator 10. Since both the actuating chambers are in the same pressure, the stiffness of the actuator 10 is extremely increased with the piston therein being firmly held stationary even when subjected to any disturbance.

As shown in FIG. 4, the present embodiment provides a hysteresis range located on the opposite sides of the target position $\theta_A$ and having a width of $\theta_H$ on one side. In the hysteresis range, the control cannot be effected with respect to the movement of the piston 26.

In FIG. 4, the curve of movement indicates that the piston 26 will move beyond the hysteresis range at time $t_4$ after positioned. In accordance with the present embodiment, such an undesirable overshooting movement of the piston 26 can be corrected since there is another low-speed period on the side of the target position $\theta_A$ opposite to the aforementioned low-speed period. In the opposite low-speed period, the return control is effected with the reverse polarity to return the curve of movement to the target position $\theta_A$ in accordance with the same principle as in FIG. 5. Thus, the piston can rapidly obtain its steady position.

The set value $\theta_H$ of the hysteresis range also has been supplied from the setting device 38 to CPU 30.

It will be apparent from the foregoing that the present invention provides an extremely stable stopping action having an increased stiffness at the target position since the piston is moved at its maximum acceleration in the high-speed range wherein the initial driving force is required to be maximum, and then is controlled at lower speeds by gradually increasing the internal pressures of both the actuating chambers in the low-speed period preset near the target position.

Furthermore, the exciting circuit for actuating the respective on-off control valves is such that the initial current applied to the exciting coil is reduced to a smaller value sufficient to maintain its condition after each of the control valves has been opened. Although the control valves have been described to be controlled by pulse width in the low-speed period to intermittently open and close the actuating chamber, each of the control valves may be comprised by a plurality of valve assemblies some of which is selected to control the venting for the desired low-speed control.

Construction of Control Valve

Figure 6:
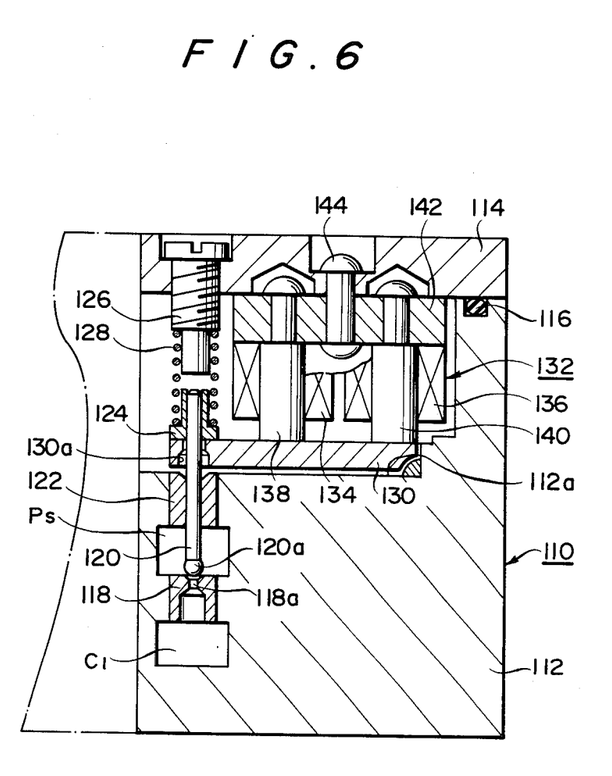
FIG. 6 is a fragmentary cross-section of a first preferred embodiment of a high-speed control valve used in the present invention.

Referring now to FIG. 6, there is shown a first preferred embodiment of the control valve according to the present invention. Actually, a plurality of valve assemblies 110 are arranged as in the control valves $V_1$–$V_4$ shown in FIG. 2. These valve assemblies 110 are identical with in construction. Therefore, a single valve assembly 110 will be described below.

The valve assembly 110 comprises a base body 112 and a closure member 114. An O-ring seal 116 is compressively disposed between the base body 112 and the closure 114 to seal flow passages provided in the valve assembly 110.

The base body 112 includes control flow passages for applying pressurized air, which includes a flow passage $P_s$ connected with a source of pressurized fluid and an output passage $C_1$ connected to a load as in the valve $V_1$ of FIG. 2.

Between the control flow passages $P_s$ and $C_1$ there is provided a valve seat 118 which is rigidly mounted on the base body 112. The valve seat 118 includes an opening 118a formed therein through which the flow passages $P_s$ and $C_1$ are connected with each other.

The present invention is characterized by a rod valve 120 which is axially movable away from and toward the valve seat 118. When the lower tip 120a of the rod valve 120 engages the valve seat 118, the opening 118a of the valve 118 is closed. The rod valve 120 is slidably supported substantially at its intermediate portion by a bearing 122 which is rigidly mounted on the base body 112. A spring retainer 124 is press-fitted over the other end of the rod valve 120. A coil spring 128 is compressively located around the rod valve 120 between the spring retainer 124 and a spring seat 126 which is threaded into a threaded opening formed through the closure member 114. As a result, the rod valve 120 is biased by the spring 128 downwardly, that is, to a position in which the opening 118a of the valve seat 118 is closed by the lower end 120a of the rod valve 120. In the first embodiment illustrated, therefore, the valve seat opening 118a is normally closed by the rod valve 120 to block the communication of the control flow passage $P_s$ with the control flow passage $C_1$.

By rotating the spring seat 126 relative to the closure 114, the biasing force of the spring 128 relative to the rod valve 120 can be adjusted.

To move the rod valve 120 against the force of the coil spring 128, there is provided a movable iron piece 130 which is loosely inserted into a cavity 112a formed in the base body 112 and then freely movable within the cavity 112a. The iron piece 130 has an opening formed therethrough at one end, through which the rod valve 120 extends downwardly. The spring retainer 124 engages the top face of the movable iron piece 130 at that end.

A solenoid block 132 is disposed above the movable iron piece 130. When the solenoid block 132 is electrically excited, the movable iron piece 130 is electromagnetically attracted by the solenoid block 132 as shown in FIG. 6.

The solenoid block 132 includes two solenoids 134 and 136 each of which surrounds a core 138 or 140. A laminated iron yoke 142 is riveted to the cores 138 and 140. The solenoid block 132 so constructed is rigidly mounted on the closure member 114 by the use of a rivet 144.

When the solenoids 134 and 136 are electrically excited by an external input command, the movable iron piece 130 is electromagnetically attracted by the cores 138 and 140 against the force of the coil spring 128 to move the rod valve 120 upwardly to open the valve seat opening 118a.

Where the solenoid block 132 is not energized, the rod valve 120 is biased by the spring 128 to close the valve seat opening 118a so that the communication between the flow passages $P_s$ and $C_1$ will completely be shut off.

When the solenoids 134 and 136 are energized in accordance with the external input command, the iron piece 130 is immediately moved upwardly to separate the rod valve 120 from the valve seat 118 rapidly. Thus, the control fluid can be supplied from the source to the output flow passage $C_1$ with a reduced delay. Since the electromagnetic system has its rapid response in the present invention, it can be on-off controlled by the use of high frequency. The control according to the present invention can rapidly control hydraulic or pneumatic control instruments in various robots or the like with higher accuracy.

Figure 7:
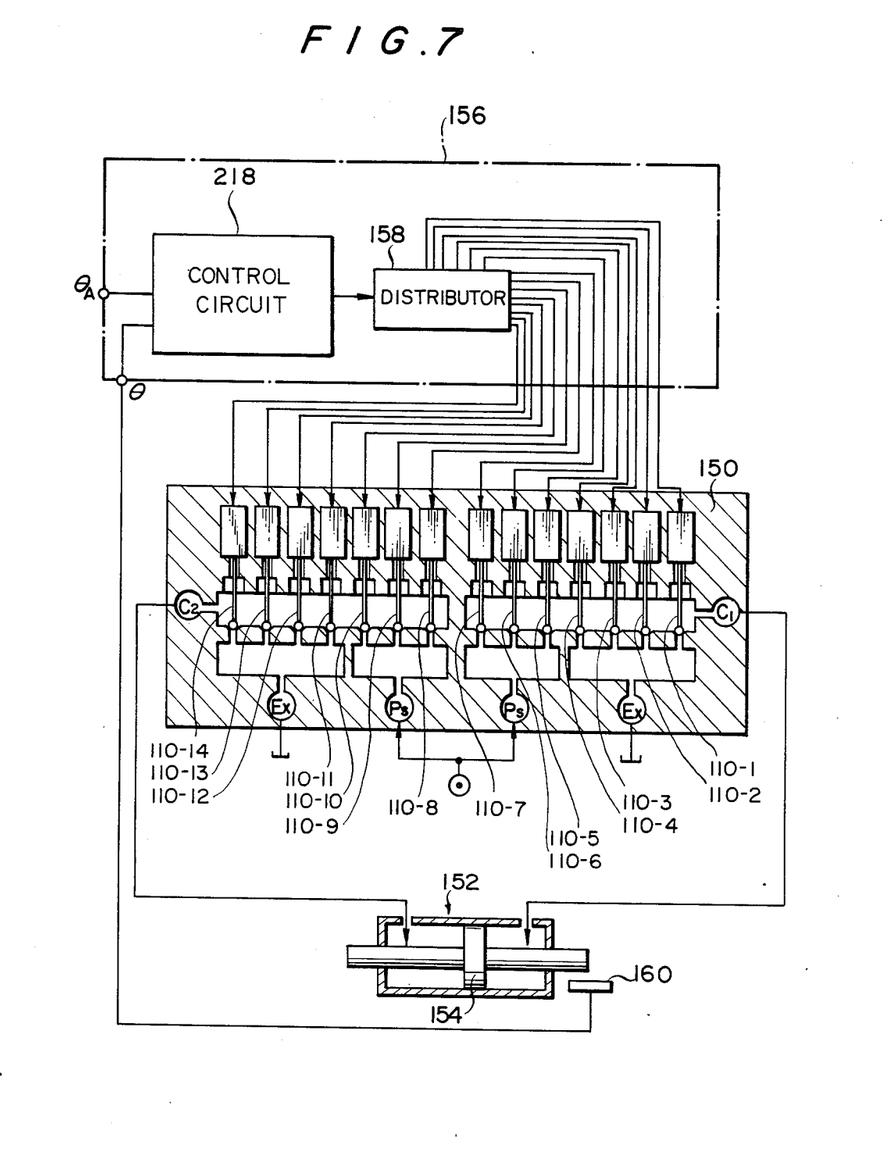
FIG. 7 is a view showing the entire construction of an assembly comprising a plurality of valves used to actuate a pneumatic actuator in accordance with the principle of the present invention.

FIG. 7 schematically shows a pneumatic valve selection circuit for a pneumatic actuator including a plurality of said valve assemblies 110 according to the present invention. The pneumatic selection circuit 150 includes a source pressure passage $P_s$, an exhaust passage Ex and output passages $C_1$ and $C_2$. One of the output passages $C_1$ is connected with the right-hand actuating chamber of the pneumatic actuator 152 defined by a piston 154 while the output passage $C_2$ is connected with the left-hand actuating chamber of the pneumatic actuator 152.

The pneumatic selection circuit 150 also comprises fourteen valve assemblies 110-1, 110-2, ... 110-14. Among them, four valve assemblies 110-1, 110-2, 110-3 and 110-4 are used to open the output passage $C_1$ to atmosphere as in the valve $V_3$ of FIG. 2. The other three valve assemblies 110-5, 110-6 and 110-7 are utilized to apply the source pressure $P_s$ to the output passage $C_1$ as in the valve $V_1$ of FIG. 2. The other three valve assemblies 110-8, 110-9 and 110-10 are used to connect the load side passage $C_2$ with the source pressure $P_s$ as in the valve $V_2$ of FIG. 2. The remaining valve assemblies 110-11, 110-12, 110-13 and 110-14 are utilized to vent the load side passage $C_2$ to atmosphere as in the valve $V_4$ of FIG. 2.

Each of the valve assemblies 110-1 to 110-14 includes a solenoid which can selectively be energized externally through a control circuit block 156. This block 156 includes a distributor 158 which is adapted to select and operate the desired combination of the valve assemblies. The control circuit block 156 comprises a control circuit 218 which includes a comparator comparing an external command signal with a fedback signal from a position detector (potentiometer) 160 which is driven by the pneumatic actuator 152. The control circuit 118 further includes a computing device. When the present position of the actuator 152 is detected by the position detector 160, the latter generates an exciting signal which in turn is supplied to the corresponding valve assembly 110 to effect the desired pulse control therein. Thus, the flow rate, pressure and velocity of the control fluid can be controlled to move and position the actuator rapidly with high accuracy.

The control of flow rate may be effected by controlling the number of the valve assemblies to be actuated in addition to the above duty ratio control. The combination of various control systems can control the actuator extremely delicately.

In accordance with the principle of the present invention, the valve assemblies may have their openings of different areas. By combining these valve openings in various fashions, the flow rate or flow velocity may more delicately be controlled.

Figure 8:
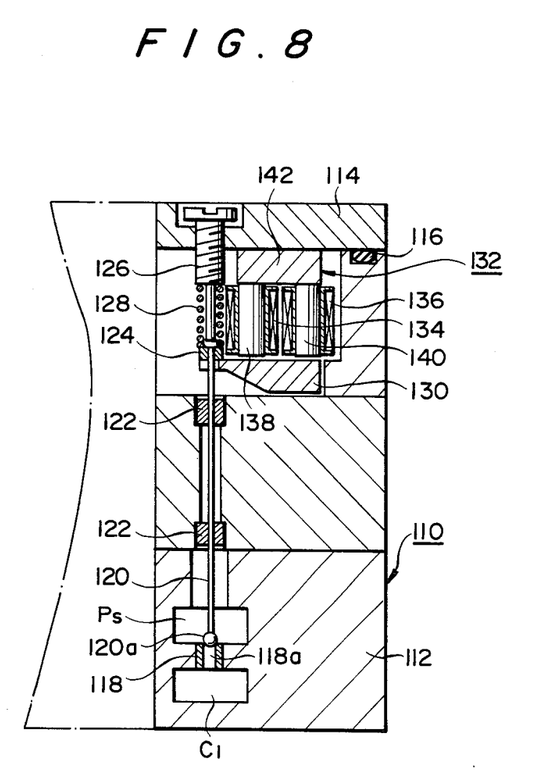
FIG. 8 is a fragmentary cross-section of a second preferred embodiment of the high-speed control valve used in the present invention.

FIG. 8 shows a second embodiment of the high-speed control valve according to the present invention in which similar parts are denoted by similar reference numerals. The second embodiment is characterized by the fact that a ball is rigidly mounted on the lower tip 120a of the rod valve 120 and co-operates with a cylindrical valve seat 118 to completely prevent the fluid from leaking therethrough.

In the second embodiment, a spring seat 126 has its lower end located more close to a spring retainer 124. The lower end of the spring seat 126 also serves as a stopper against the upward movement of the rod valve 120. Therefore, the spring retainer 124 is engaged and stopped by the spring seat 126 to hold a movable iron piece 130 away from cores 138 and 140 with a slight clearance. When the solenoids 134 and 136 are dis-energized, the movable iron piece 130 can rapidly be separated from the cores 138 and 140 to improve the response of the system.

Figure 9:
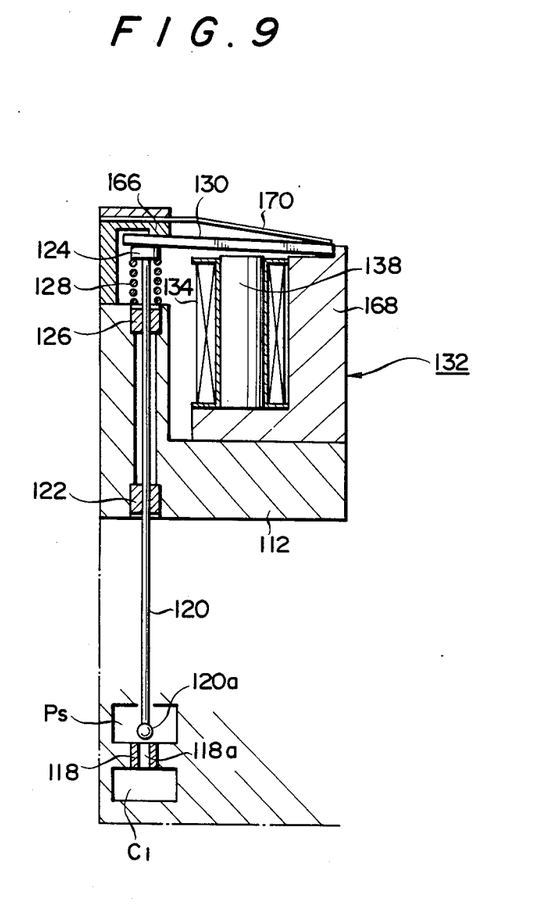
FIGS. 9 and 10 are cross-sectional views of the primary parts of the third and fourth embodiments of the control valve according to the present invention, respectively.

FIG. 9 shows a third embodiment of the high speed type control valve according to the present invention in which similar parts are designated by similar reference numerals.

The third embodiment is characterized by the fact that a rod valve 120 is biased away from its valve seat 118 under the influence of a coil spring 128. This spring 128 is compressively located between a spring seat 126 rigidly mounted on a base body 112 and a spring retainer 124 rigidly mounted on the upper end of the rod valve 120.

A movable iron piece 130 is held at one end between the spring retainer 124 and a holder 166. The other end of the iron piece 130 is engaged and held by a yoke 168 on a solenoid block 132. A holding-down spring 170 is rigidly mounted at one end on the holder 166 with the free end thereof providing a holding force by which the iron piece 130 is biased against the yoke 168.

In the arrangement of the third embodiment, when a solenoid 134 is energized by an external input command, the movable iron piece 130 is electromagnetically attracted by the solenoid 134 to move the rod valve 118 downwardly such that the valve seat opening 118a will rapidly be closed by the ball 120a.

Figure 10:
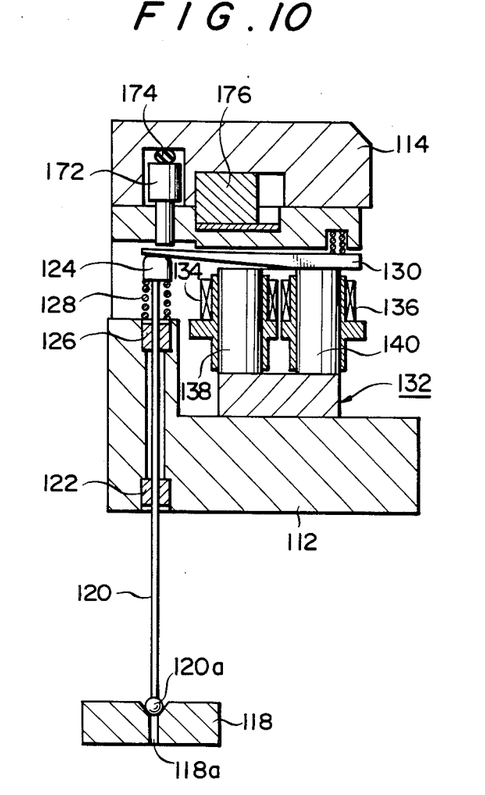

FIG. 10 shows a fourth embodiment of the control valve according to the present invention in which similar parts are denoted by similar reference numerals.

The fourth embodiment is characterized in that when a rod valve 120 is upwardly moved by a spring 128 to open a valve seat 118, a movable iron piece 130 upwardly moved by a spring retainer 124 is gently engaged by a shock absorbing stopper 172 mounted on a closure member 114. For this purpose, a damper 174 of any suitable elastomer material such as rubber is interposed between the shock absorbing stopper 172 and the closure member 114. Furthermore, a permanent magnet 176 is mounted in the closure member 114 to increase the velocity of the rod valve 120 when it is moved to open the valve seat under the action of the spring 128 on dis-energizing of the solenoid block 132. Consequently, the movable iron piece 130 is always attracted by the permanent magnet 176 such that the valve seat opening 118a will more rapidly be opened.

Figure 11:
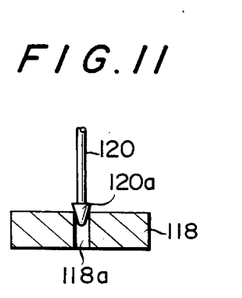
FIGS. 11 and 12 are cross-sectional views showing the tip constructions of rod valves preferably used in the present invention, respectively.
Figure 12:
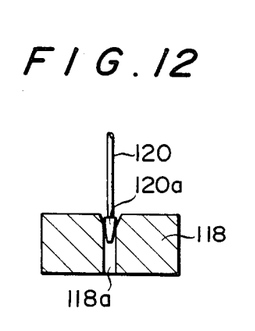

FIGS. 11 and 12 illustrate two preferred forms of the lower tip of the rod valve according to the present invention.

In the preferred form of FIG. 11, the rod valve 120 has a conical tip 120a which can provide a better co-operation with a valve seat 118 to close and open the valve seat opening 118a. The rod valve 120 shown in FIG. 12 has a cylindrical tip portion 120a which can slidably be located within the valve seat opening 118a. In the latter arrangement, the required stroke of the rod valve 120 is larger than those of the other embodiments of the present invention. However, it is advantageous in that there is less wear between the valve body and the valve seat 118 to improve the durability.

It will be apparent from the foregoing that in accordance with the present invention, the fluid actuator can initially be driven at higher speeds in the high-speed range and also accurately stopped in the low-speed range. This is very suitable for use in various industrial instruments and particularly for the control of robot arms and the like.

Furthermore, the present invention provides a high speed type fluid valve which can rapidly be controlled and very suitable for use in controlling and positioning various type hydraulic or pneumatic actuators.

I claim:

1. An apparatus for controlling and positioning a fluid actuator including left- and right-hand actuating chambers, said apparatus being characterized by control valve means for selectively supplying pressurized fluid to the left- and right-hand actuating chambers of said actuator and for selectively opening the left- and right-hand actuating chambers to atmosphere, a means for sensing a present position of said actuator and for generating a signal indicative of said present position, a means for setting a target position of said actuator, a control means for receiving said signals indicative of the present position of said actuator and said target position of said actuator and effective to provide an initial high-speed driving force to said actuator by supplying one of said actuating chambers with a source of pressurized fluid while opening the other actuating chamber and to provide a low-speed driving force to said actuator by applying the source of pressurized fluid to said actuator while partially closing the other actuating chamber near the target position, said partial closing of the other actuating chamber being accomplished by intermittently closing said other actuating chamber for variable time periods, the intermittent closing of the other actuating chamber being pulse width modulated and the variable time period (t) is calculated by the formula:

$$\Delta t = \beta_1 - (\beta_2 - |V_n|)$$

wherein $\beta_1$ and $\beta_2$ are constants and $V_n$ is the velocity of the actuator.

2. An apparatus according to claim 1 further comprising a means for setting a low-speed range occurring when the present position is with $\pm \theta_1$ of the target position $\theta_a$, wherein $\theta_1$ is a predetermined displacement constant, a high-speed range occurring when the present position is outside of $\theta_a + \theta_1$ adjacent the low-speed period, a sampling time and constants $\beta_1$, $\beta_2$ and $\beta_3$ and a means for determining the velocity of the actuator in accordance with the formula as follows:

$$V_n = (\theta_n - \theta_{n-1})/\Delta T$$

3. An apparatus according to claim 2, wherein a braking range occurring between $\theta_a - \theta_1$ and $\theta_p$ is provided between said high and low periods and said braking period is calculated by a formula as follows:

$$\theta_p = \theta_A - \theta_L - \beta_3 V_n \cdot |V_n|$$

wherein $\theta_A$ is a target position of said actuator and $\beta_3$ is constant.

4. An apparatus according to claim 1, wherein said control valve means comprises a plurality of valve assemblies provided in control flow passage means, said valve assemblies being combined to provide ON/OFF control to control the flow rate in said control flow passage means, each of said valve assemblies comprising a valve seat having a valve opening communicating with said control passage means, a rod valve axially slidably supported with a tip thereof for opening and closing said valve opening of said valve seat, spring means biasing said valve in an axial direction, a movable iron piece engaged at one end of said rod valve and effected to move said rod valve against the biasing force of said spring means and solenoid means electrically energized to extract said movable iron piece, whereby the axial movement of said valve rod controls the valve opening of each of said valve assemblies.

5. An apparatus according to claim 4, wherein there are fourteen valve assemblies.

6. An apparatus according to claim 5, further comprising a distributor means for selecting ones of the valve of the assemblies to be operated.

7. An apparatus according to claim 6, wherein said spring means biases said rod valve such that said tip thereof is biased away from said valve opening of said valve seat.

8. An apparatus according to claim 6, wherein said spring means biases said valve rod in an axial direction such that said tip thereof is biased into engagement with said valve opening of said valve seat.

* * * * *